INVENTORS
HERBERT C. BRAUCHLA
PAUL P. RUMINSKY
BY Semmes and Semmes
ATTORNEYS

INVENTORS
HERBERT C. BRAUCHLA
PAUL P. RUMINSKY
BY Semmes and Semmes
ATTORNEYS

United States Patent Office 3,250,390
Patented May 10, 1966

3,250,390
MOBILE APPARATUS FOR VIBRATORY COMBING
Herbert C. Brauchla, Fremont, and Paul P. Ruminsky, Amherst, Ohio; said Ruminsky assignor to said Brauchla, Fremont, Ohio
Filed Feb. 15, 1963, Ser. No. 258,821
2 Claims. (Cl. 209—252)

This application is a continuation-in-part of applicant's co-pending application Serial No. 223,626 which issued on July 21, 1964 as U.S. Letters Patent 3,141,844 entitled Method and Apparatus for Dry Sizing. The present application is also related to applicant's co-pending application Serial No. 251,784 which issued September 14, 1965 as U.S. Letters Patent 3,206,028 entitled Vibratory Sizing Apparatus.

The present invention relates to a vibratory combing apparatus, particularly designed for repetitive combing within a sustained horizontal plane.

More particularly, the present invention embodies improvements over U.S. Letters Patent 3,141,844 in the step of combing variously located surfaces, as well as structural improvement in the combing head and stand. Further, invention in the present instance is distinguished from U.S. Letters Patent 3,206,028 in the articulation of the stand and vertical pivotability of the combing head which facilitates portability and enables a combing attack in a variety of attitudes.

Accordingly, the present invention concerns solely a vibratory combing apparatus operable apart from any conveyor belt or inclined table conveyance. It is anticipated that the wheeled portability of the vibratory combing stand and vertical pivotability of the combing head will enable a placement of the assembly across conventional industrial conveyances for sizing, carding or combing, against earth or roadway for pulling by tractor and in other operations wherein a repetitive combing is desired.

The present assembly includes a wheeler and articulated stand and a vibratory combing head pivotably supported by said stand for unobstructed engagement throughout any horizontal or inclined plane. The comb assembly includes a plurality of combs with radially extending teeth mounted upon an endless belt, chain or like means having an elongated cross-section so that a plurality of the combs at all times are in a horizontal plane of contact with the surface to be combed.

Accordingly, it is an object of invention to provide apparatus for repetitive combing attack within a variety of attitudes.

Another object of invention is to provide a vibratory combing assembly which may be applied to a variety of industrial uses.

Yet, additional objects of the invention will become apparent from the ensuing specification and attached drawings wherein.

Figure 1:
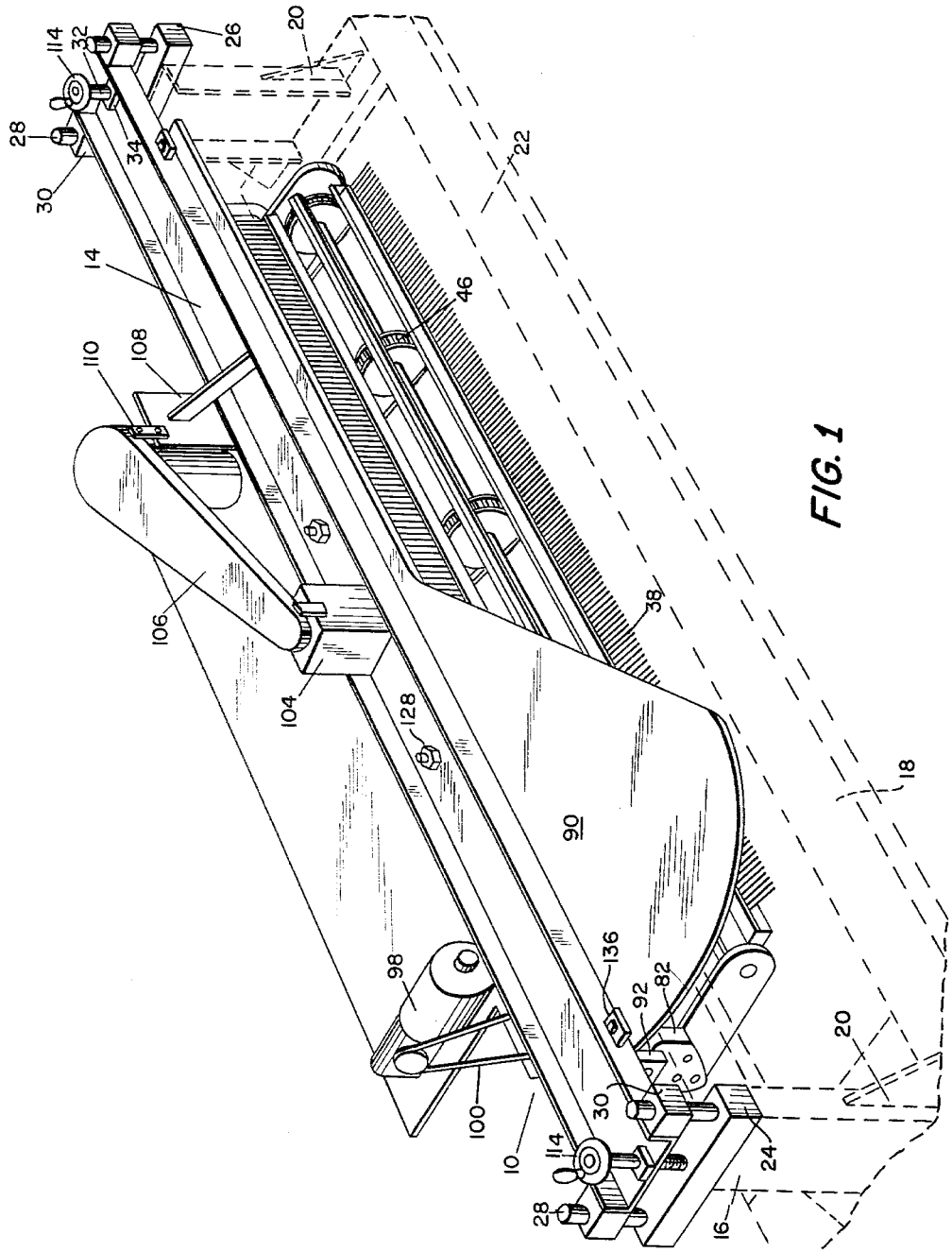
FIG. 1 is a perspective view, partially in fragment of the proposed assembly.

In FIG. 1 vibratory combing head 10 is represented as comprising combing assembly 12 suspended from top cross piece channel 14 in turn supported by end upright members 16. These end upright members 16 may be supported upon floor pieces 18 by means of skirt elements 20 and lateral stability may be provided by transverse channels 22 interconnecting the bottom pieces 18. Welded to the individual upright pieces 16 may be top support pieces 24 and 26 having vertically projecting dowels 28 which engage blocks 30 attached to channel 14. Vertical adjustment of channel 14 is finely provided by threaded bolt 32 extending from the pieces 24 and 26 engaging nut 34 and being actuated by hand-turning wheel 114.

Figure 2:
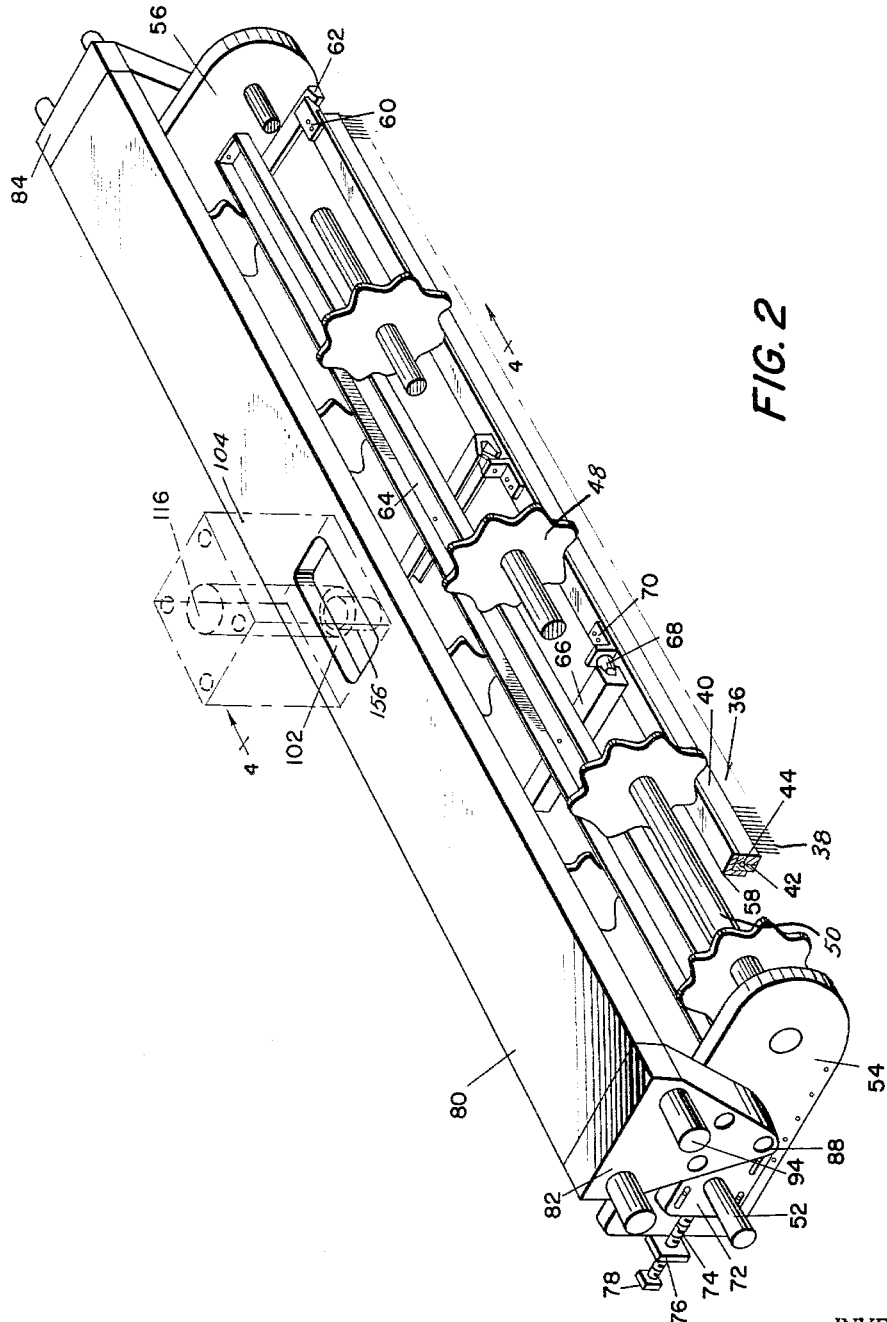
FIG. 2 is a perspective partially in fragment of the combing head apart from its stand, showing the eccentric vibrating in phantom.
Figure 3:
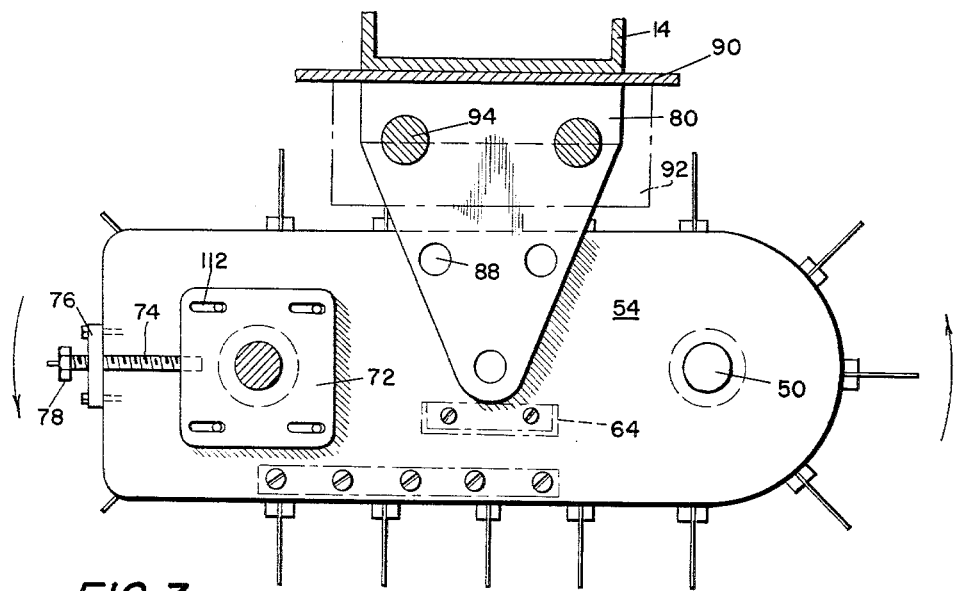
FIG. 3 is an enlarged side elevation of the combing assembly end plates suspended from the top piece channel.
Figure 4:
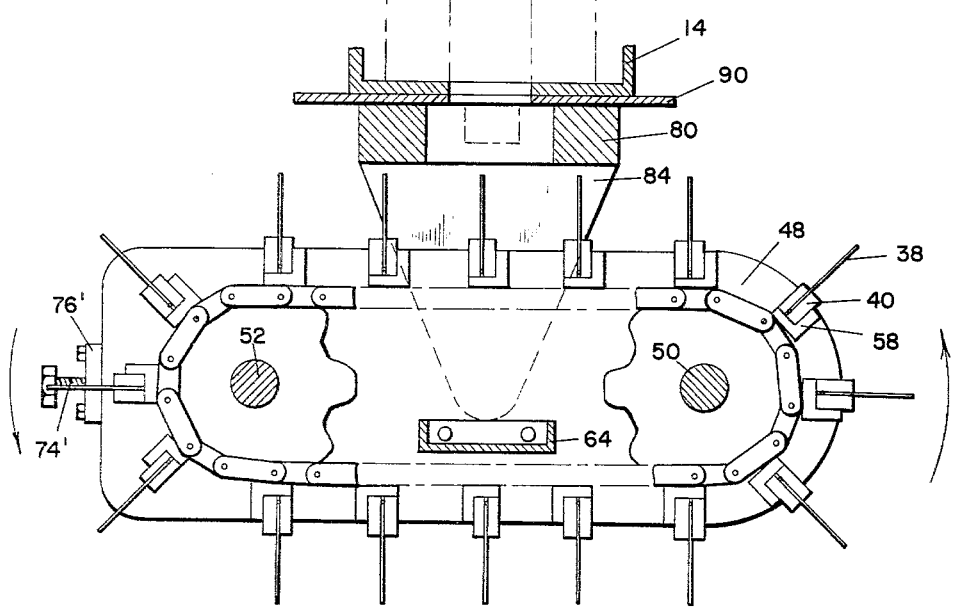
FIG. 4 is a vertical section taken along section line 4—4 of FIG. 2 showing the positioning of individual comb elements with respect to the chain drive.

As illustrated more particularly in FIG. 2, individual comb elements 36 comprise piano-wire or like stiff bristles 38 supported in opposed base pieces 40. A pinching attachment about bristles 38 is effected by medial slot 42 formed in the bottoms of the base element 40 and positioning of rod 44 therein. The individual base pieces 40 may be secured to comb channel 58, in turn secured to chain 46 which revolves about sprockets 48. The sprockets 48 may be mounted upon drive shaft 52 and driven shaft 50 secured between end-pieces 54 and 56. Drive shaft 52 is driven by motor 98 mounted upon bolster plate 90 and connected to drive shaft 52 by means of belt 100. Tensioning of belt 100 and speed adjustment may be effected by movement of bearing plate 72 in its slots 112 by means of threaded bolt 74 engaging brackets 76 attached to end pieces 54 and 56. Bolt 76 may be turned by wrench engagement of nut 78.

Figure 6:
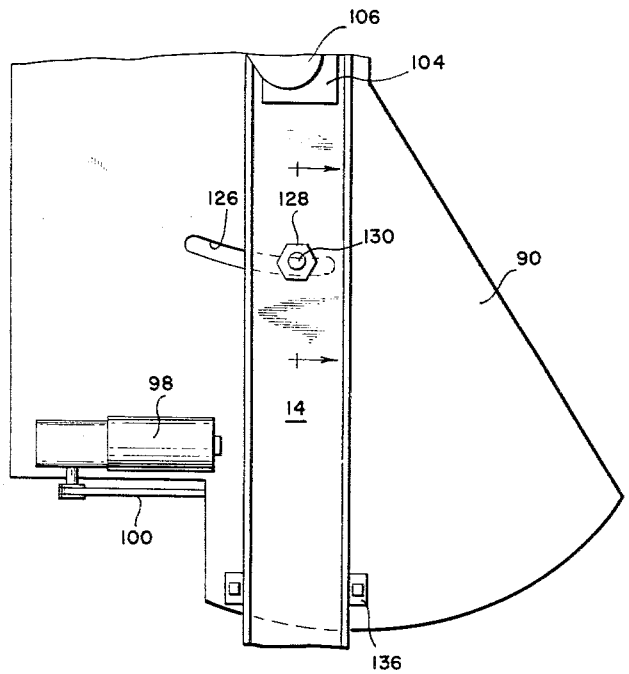
FIG. 6 is a top plan view, partially in fragment of the proposed assembly.
Figure 7:
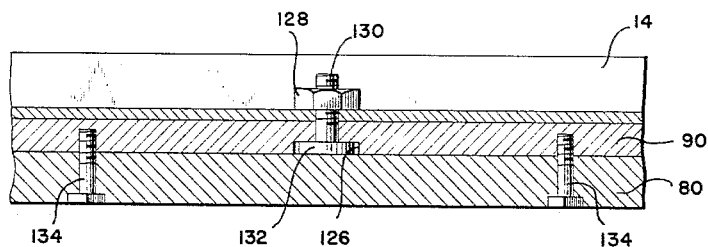
FIG. 7 is an enlarged vertical section of a portion of the assembly shown in FIG. 6.

Channels 58 may employ side bars 60 which engage side support pieces 62 for vertical support and in turn bronze rollers 68 supported by bracket 70 may engage guide bars 66 attached to inner support brace 64. The comb assembly is pivotably suspended from yoke 80 secured to pieces 82 and 84 by means of securing pins 88. The yoke, in turn, is suspended from bolster 90 by means of yoke extensions 94 engaging blocks 92 suspended from the bottom of bolster plate 90. Bolster plate 90 is designed for transverse pivoting in a 45° plane so that the angle of attack of the individual combs may be diverged with respect to the longitudinal axis of the plane being attacked. As illustrated in phantom in FIG. 2, eccentric shaft 116 is mounted in a suitable bearing assembly block 104 supported upon channel 14. As described and illustrated in detail in U.S. Letters Patent 3,206,028, shaft 116 is supported by conventional bearings located within block 104 and terminates downwardly in a tip 156 extending into an eccentric piece located within top of yoke 80. Although details of construction are not presented herein, Patent 3,206,028 indicates general mode of varying extent of eccentricity. As seen in FIGS. 1 and 6, bolster plate 90 may be pivoted about shaft 116, by hand, so that the angle of attack of yoke 80 and subsequently the individual comb elements 36 are diverged with respect to the longitudinal axis of the plane being attacked. The eccentric assembly block 104 is attached to the middle part of channel 14 so that eccentric shaft 116 engages eccentric block 102 in the yoke 80. Motor 110 mounted upon the channel 14 by means of bracket 108 activates eccentric shaft 116 by means of a belt contained in belt cover 106.

Figure 5:
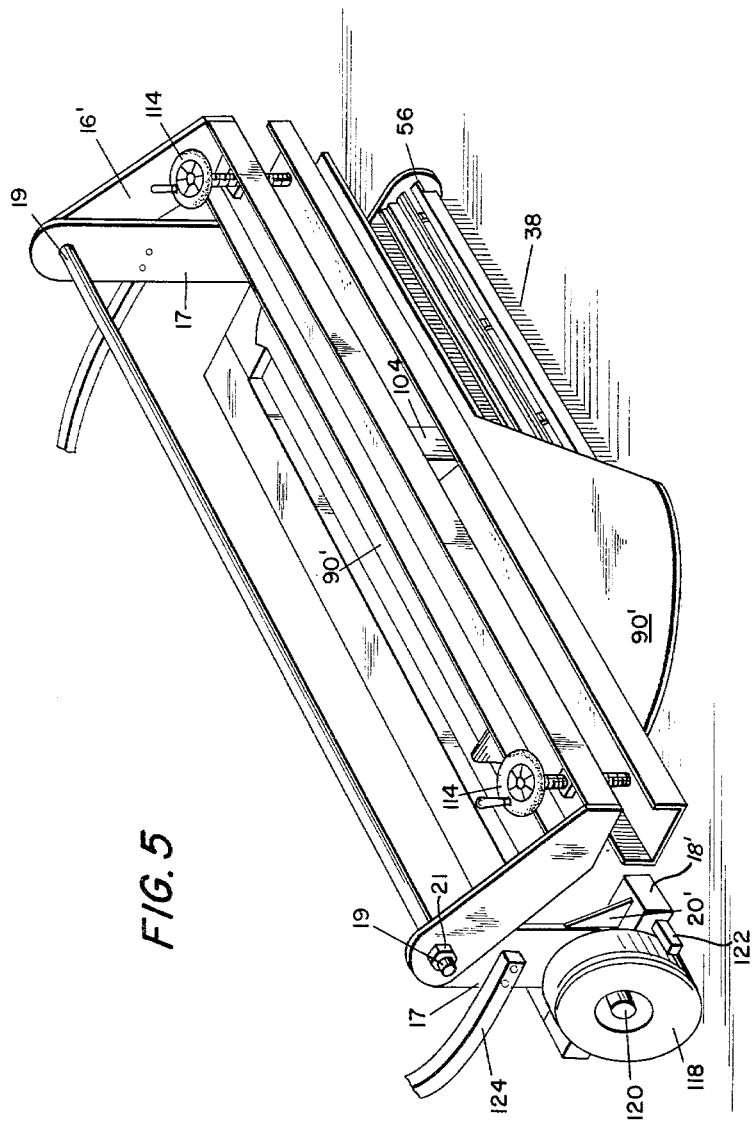
FIG. 5 is a perspective of a modified form of invention wherein the stand is both articulated and wheel-mounted, enabling unobstructed engagement of the combing head against the earth or through a variety of raised attitudes.

In the modified form of invention illustrated in FIG. 5 the articulation of upright pieces 16' with respect to member 17 enables vertical pivoting of the comb assembly upon pins 19 and locking against movement with lock nuts 21: as a result, the combs are presented for unobstructed attack in a variety of planes. Hand crank locking means (not illustrated) may be employed for locking of piece 16' with respect to rigid member 17. Also, retractable wheels 118 may be mounted upon axle 120 having a raised mid portion. By turning lever 122 the wheels may be locked against the earth, while raising base members 18'. In this attitude the assembly may be pulled by securing tractor hitch elements to lugs 124. It is contemplated that the assembly in this attitude could not only be used for sizing, but also could be used for earth working or harrowing, raking, cement mixing, blending of aggregates for road building and the like. In harrowing use, it is believed that the assembly will collect and divert aside rocks, sticks and other large sized foreign matter while working the soil.

As will be apparent, the vibrating of the comb assembly as it rotates through its horizontal plane of attack enhances the combing action, the vibration serving both to unclog over-sized matter caught in the individual bristles and to relieve and to enhance the penetrating characteristics of the comb as it attacks the matter to be combed. It has been found that controls may consist in the rate of rotation of the individual chains, the speed and amplitude of vibration of the comb assembly, the obliquity of support of the comb assembly with respect to the matter being treated, the degree of spacing between individual comb elements and the spacing between the individual comb teeth. The comb assembly has been rotated in the range 75 to 115 feet per minute. The eccentric has been operated at 2,500 r.p.m. providing vibrations in the amplitude 0.30 inch. However, the achievements are not to be considered as any limit of the capabilities of the assembly. Manifestly, interchange of structural parts and various modifications may be devised without departing from the spirit and scope of invention as defined in the sub-joined claims.

What is claimed is:
1. A combing head for sizing of matter, comprising:
 (A) a vibrating comb assembly supported in said head for unobstructed engagement in a horizontal plane and including a plurality of transversely aligned radially extending combs mounted upon an endless, rotatable combing belt supported in said assembly with its top and bottom portions parallel in said horizontal plane;
 (B) lateral vibrating means mounted in said head and attached to said comb assembly for vibrating said combs laterally within their transversely aligned planes;
 (C) a wheeled stand supporting said comb assembly with respect to a surface to be combed; and
 (D) pivoting means articulated on said stand and connected to said comb assembly enabling said comb assembly to pivot vertically about said stand.

2. A vibratory combing head, comprising:
 (A) a stand having:
  (i) at least two articulated upstanding members spaced apart,
  (ii) a top rail connected to said upstanding members,
  (iii) a bolster plate depending from said top rail and pivoting transversely therein,
 (B) a vibratory combing assembly pivoted in said bolster plate in a horizontal plane, said combing assembly also being connected to said articulated members and being vertically pivoted therein thereby being presentable for attack in a plurality of vertical planes, said combing assembly including:
  (i) a plurality of transversely aligned radially extending combs mounted upon an endless rotatable combing belt of elongated cross-section supported in said assembly with its top and bottom portions parallel in said horizontal plane;
 (C) lateral vibrating means mounted in said head and attached to said comb assembly for vibrating said combs laterally within their transversely aligned planes; and
 (D) wheel means depending from said stand, and engageable with a supporting surface, said wheel means being totally disengageable from said supporting surface, as desired.

References Cited by the Examiner

UNITED STATES PATENTS

| | | | |
|---|---|---|---|
| 400,351 | 3/1889 | Michael | 172—40 |
| 1,186,375 | 6/1916 | Burrows | 172—97 |
| 1,197,338 | 9/1916 | Broad | 15—22.3 X |
| 1,659,211 | 2/1928 | Minich | 22—89 |
| 1,869,991 | 8/1932 | White | 15—22.3 X |
| 2,304,882 | 12/1942 | Burg | 22—89 |
| 2,443,785 | 6/1948 | Burg | 22—89 |
| 2,445,162 | 7/1948 | Wallace | 56—34 |
| 2,517,733 | 8/1950 | Takats | 172—40 |
| 3,141,844 | 7/1964 | Brauchla | 209—392 X |

FOREIGN PATENTS 1,022,404 1/1958 Germany.

HARRY B. THORNTON, *Primary Examiner.*

HERBERT L. MARTIN, *Examiner.*

R. HALPER, *Assistant Examiner.*